(12) United States Patent
Egedal et al.

(10) Patent No.: US 8,829,699 B2
(45) Date of Patent: Sep. 9, 2014

(54) ROTATIONAL SPEED CONTROL OF A WIND TURBINE BASED ON ROTOR ACCELERATION

(75) Inventors: Per Egedal, Herning (DK); Ole Kjaer, Grindsted (DE); Soeren Oemann Lind, Næstved (DK); Henrik Stiesdal, Odense (DK); Martin Winther-Jensen, Haslev (DK)

(73) Assignee: Siemens Aktiengesellschaft, Munich (DE)

( * ) Notice: Subject to any disclaimer, the term of this patent is extended or adjusted under 35 U.S.C. 154(b) by 516 days.

(21) Appl. No.: 13/040,540

(22) Filed: Mar. 4, 2011

(65) Prior Publication Data

US 2011/0221194 A1 Sep. 15, 2011

(30) Foreign Application Priority Data

Mar. 10, 2010 (EP) .................................... 10156049

(51) Int. Cl.
*F03D 9/00* (2006.01)
*H02P 9/04* (2006.01)
*F03D 7/04* (2006.01)
*F03D 7/02* (2006.01)

(52) U.S. Cl.
CPC ......... *F03D 7/0276* (2013.01); *F05B 2270/327* (2013.01); *F05B 2270/101* (2013.01); *F05B 2270/309* (2013.01); *F05B 2270/102* (2013.01); *F05B 2270/1011* (2013.01); *F03D 7/042* (2013.01); *Y02E 10/723* (2013.01); *F03D 7/0224* (2013.01); *F03D 7/028* (2013.01); *F05B 2270/1016* (2013.01)
USPC .............................................. 290/44; 290/55

(58) Field of Classification Search
CPC ......... B60L 8/006; F03D 9/002; F03D 7/042; F03D 9/003; F05B 2220/706; F05B 2260/821; F05B 2270/1011; F05B 2270/1016; F05B 2270/327; Y02T 10/7083; Y02B 10/30; H02P 21/0003; Y02E 10/223; Y02E 10/723
USPC ..................................................... 290/44, 55
See application file for complete search history.

(56) References Cited

U.S. PATENT DOCUMENTS

| | | | | |
|---|---|---|---|---|
| 3,640,588 | A | * | 2/1972 | Carp et al. ..................... 303/159 |
| 4,189,648 | A | | 2/1980 | Harner .............................. 290/44 |
| 4,193,005 | A | * | 3/1980 | Kos et al. ......................... 290/44 |
| 5,212,943 | A | * | 5/1993 | Harris .............................. 60/790 |
| 6,023,141 | A | * | 2/2000 | Chalupa ................... 318/400.35 |
| 6,755,177 | B2 | * | 6/2004 | Woolford et al. ............. 123/333 |

(Continued)

FOREIGN PATENT DOCUMENTS

| | | |
|---|---|---|
| CN | 101493864 A | 7/2009 |
| DE | 361 857 C | 10/1922 |

(Continued)

*Primary Examiner* — Pedro J Cuevas

(57) ABSTRACT

It is described a method for controlling the rotational speed of a rotor of a wind turbine in particular at high wind speeds. The described method comprises (a) determining a rotor acceleration value, wherein the rotor acceleration value is caused by a temporal change of the rotational speed of the rotor, and (b) controlling the rotational speed of the rotor as a function of the rotor acceleration value. It is further described a control system for controlling the rotational speed of a rotor of a wind turbine, a wind turbine being equipped with such a control system and to a computer program, which is adapted for controlling and/or for carrying out the mentioned rotational speed control method.

11 Claims, 2 Drawing Sheets

(56) References Cited

U.S. PATENT DOCUMENTS

| | | | |
|---|---|---|---|
| 6,825,627 B2* | 11/2004 | Berroth et al. | 318/400.13 |
| 6,835,161 B2* | 12/2004 | Grillenberger et al. | 477/77 |
| 6,906,484 B1* | 6/2005 | Berroth et al. | 318/434 |
| 6,906,486 B2* | 6/2005 | Berroth et al. | 318/400.29 |
| 6,940,243 B2* | 9/2005 | Berroth et al. | 318/400.29 |
| 6,956,343 B2* | 10/2005 | Berroth et al. | 318/400.03 |
| 7,386,381 B2* | 6/2008 | Matsushima et al. | 701/51 |
| 7,390,283 B2* | 6/2008 | Rinderknecht | 477/110 |
| 7,728,452 B2* | 6/2010 | Arinaga et al. | 290/44 |
| 7,854,589 B2* | 12/2010 | Nielsen et al. | 416/1 |
| 7,880,321 B2* | 2/2011 | Arinaga et al. | 290/44 |
| 7,982,327 B2* | 7/2011 | Arinaga et al. | 290/44 |
| 8,021,110 B2* | 9/2011 | Kerber | 416/1 |
| 8,039,981 B2* | 10/2011 | Egedal et al. | 290/44 |
| 8,044,670 B2* | 10/2011 | Bjerge et al. | 324/650 |
| 8,123,478 B2* | 2/2012 | Ahmann | 416/1 |
| 8,210,811 B2* | 7/2012 | Loh et al. | 416/1 |
| 8,303,251 B2* | 11/2012 | Loh et al. | 416/48 |
| 8,380,357 B2* | 2/2013 | Garcia Barace et al. | 700/287 |
| 8,390,140 B2* | 3/2013 | Bolln et al. | 290/44 |
| 8,403,786 B2* | 3/2013 | Bech | 475/5 |
| 8,493,014 B2* | 7/2013 | Henderson et al. | 318/432 |
| 8,511,988 B2* | 8/2013 | Birkemose et al. | 416/1 |
| 8,600,570 B2* | 12/2013 | Egedal et al. | 700/287 |
| 8,618,685 B2* | 12/2013 | Drossel et al. | 290/44 |
| 8,662,842 B2* | 3/2014 | Oing et al. | 416/1 |
| 8,704,480 B2* | 4/2014 | Benecke et al. | 318/778 |
| 8,710,692 B2* | 4/2014 | Bettermann et al. | 290/55 |
| 8,718,832 B2* | 5/2014 | Hashimoto et al. | 700/287 |
| 2002/0152987 A1 | 10/2002 | Woolford et al. | 123/333 |
| 2004/0027084 A1* | 2/2004 | Berroth et al. | 318/439 |
| 2004/0027085 A1* | 2/2004 | Berroth et al. | 318/439 |
| 2004/0036435 A1* | 2/2004 | Berroth et al. | 318/439 |
| 2004/0051489 A1* | 3/2004 | Berroth et al. | 318/439 |
| 2005/0234624 A1* | 10/2005 | Matsushima et al. | 701/51 |
| 2006/0140761 A1* | 6/2006 | LeMieux | 416/61 |
| 2007/0216166 A1 | 9/2007 | Schubert | 290/55 |
| 2008/0069693 A1 | 3/2008 | Malakhova et al. | 416/61 |
| 2008/0206051 A1* | 8/2008 | Wakasa et al. | 416/41 |
| 2008/0206052 A1* | 8/2008 | Volkmer | 416/61 |
| 2008/0290664 A1* | 11/2008 | Kruger | 290/55 |
| 2009/0066089 A1* | 3/2009 | Arinaga et al. | 290/55 |
| 2009/0224543 A1 | 9/2009 | Steudel et al. | 290/44 |
| 2010/0082276 A1* | 4/2010 | Becker | 702/56 |
| 2010/0133828 A1* | 6/2010 | Stegemann et al. | 290/44 |
| 2010/0209243 A1* | 8/2010 | Birkemose et al. | 416/1 |
| 2010/0237618 A1* | 9/2010 | Arinaga et al. | 290/44 |
| 2010/0322768 A1* | 12/2010 | Comandu et al. | 416/41 |
| 2011/0089694 A1* | 4/2011 | Arinaga et al. | 290/44 |
| 2011/0142620 A1* | 6/2011 | Loh et al. | 416/1 |
| 2011/0221194 A1* | 9/2011 | Egedal et al. | 290/44 |
| 2011/0255974 A1* | 10/2011 | Nanukuttan et al. | 416/146 R |
| 2011/0318165 A1* | 12/2011 | Oing et al. | 415/118 |
| 2012/0032442 A1* | 2/2012 | Wibben | 290/44 |
| 2012/0076651 A1* | 3/2012 | Laurberg | 416/1 |
| 2012/0173172 A1* | 7/2012 | Laurberg et al. | 702/56 |
| 2012/0313593 A1* | 12/2012 | Knuppel et al. | 323/234 |
| 2013/0038059 A1* | 2/2013 | Andresen et al. | 290/44 |
| 2013/0161955 A1* | 6/2013 | Dalsgaard et al. | 290/44 |
| 2013/0214537 A1* | 8/2013 | Hashimoto et al. | 290/55 |
| 2013/0221676 A1* | 8/2013 | Caldwell et al. | 290/55 |
| 2013/0234437 A1* | 9/2013 | Bjerge et al. | 290/44 |
| 2013/0241201 A1* | 9/2013 | Fortmann | 290/44 |
| 2013/0277973 A1* | 10/2013 | Nyborg | 290/44 |
| 2013/0307493 A1* | 11/2013 | Ichinose et al. | 322/40 |
| 2013/0320935 A1* | 12/2013 | Freier et al. | 322/19 |
| 2014/0003936 A1* | 1/2014 | Agarwal et al. | 416/1 |
| 2014/0003939 A1* | 1/2014 | Adams et al. | 416/1 |
| 2014/0015251 A1* | 1/2014 | Hammerum et al. | 290/44 |
| 2014/0020465 A1* | 1/2014 | Laurberg | 73/495 |
| 2014/0028025 A1* | 1/2014 | Ibendorf | 290/44 |
| 2014/0035285 A1* | 2/2014 | Creaby et al. | 290/44 |
| 2014/0070534 A1* | 3/2014 | Hamano et al. | 290/43 |
| 2014/0097619 A1* | 4/2014 | Laborda et al. | 290/44 |
| 2014/0109561 A1* | 4/2014 | Kenway et al. | 60/327 |
| 2014/0120806 A1* | 5/2014 | Duescher | 451/41 |
| 2014/0123663 A1* | 5/2014 | Ficklscherer | 60/773 |
| 2014/0127976 A1* | 5/2014 | Duescher | 451/41 |

FOREIGN PATENT DOCUMENTS

| | | |
|---|---|---|
| EP | 0 008 584 A1 | 3/1980 |
| EP | 0 847 496 B1 | 6/1998 |
| EP | 1 936 186 A2 | 6/2008 |
| EP | 1 990 539 A1 | 11/2008 |
| EP | 2 093 419 A2 | 8/2009 |
| EP | 2 096 301 A2 | 9/2009 |
| JP | 2005061300 A | 3/2005 |
| WO | WO 01/33075 A1 | 5/2001 |
| WO | WO 2008/131775 A2 | 11/2008 |

* cited by examiner

ROTATIONAL SPEED CONTROL OF A WIND TURBINE BASED ON ROTOR ACCELERATION

CROSS REFERENCE TO RELATED APPLICATIONS

This application claims priority of European Patent Office application No. 10156049.8 EP filed Mar. 10, 2010, which is incorporated by reference herein in its entirety.

FIELD OF INVENTION

The present invention relates to the technical field of operating wind turbines. In particular, the present invention relates to a method for controlling the rotational speed of a rotor of a wind turbine. Further, the present invention relates to a control system for controlling the rotational speed of a rotor of a wind turbine, to a wind turbine being equipped with such a control system and to a computer program, which is adapted for controlling and/or for carrying out the mentioned rotational speed control method.

ART BACKGROUND

Rotor blades of wind turbine are exposed to large dynamic mechanical loads in particular when the wind turbine is operated with a strong wind comprising a high speed. Therefore, the rotor blades of wind turbines and the corresponding supporting structures have been dimensioned such as to be able to withstand large dynamic loads that could occur even if the wind, which is driving the wind turbine, is strong. However, in case of extreme wind conditions the wind load on structural components of the wind turbine must be reduced in order to avoid any damage of the wind turbine.

Presently, there a known numerous methods of handling wind turbines at high wind situations. Thereby, the term "handling wind turbines" means operating the wind turbine in such a manner that the various mechanical loads acting on structural components such as for instance rotor blades of the wind turbine are kept within safe limits.

An existing very conservative measure by which the wind load on a wind turbine is reduced in high wind conditions is simply shutting down the wind turbine when the wind speed exceeds one or more threshold values. Thus a wind turbine may be shut down when the wind speed exceeds the value of about 25 m/s for about 10 minutes, when the wind speed exceeds the value of about 28 m/s for about 30 seconds or when the wind speed exceeds the value of about 32 m/s for about 1 second.

The problem with this conservative measure is when many wind turbines are hit by high wind at the same time, the power generation of all involved wind turbines goes from a full production to a zero production within a short time. Such a rapid change represents a serious challenge for the stability of the electricity grid, because the rest of the electrical suppliers of the grid need to ramp up very quickly in order to avoid an under frequency situation due to an electrical overloading.

EP 0 847 496 B discloses another measure for limiting mechanical loads acting on a wind turbine. Thereby, when a wind velocity is reached which is in danger of mechanically overloading the wind turbine, the operating speed of the rotor is continuously reduced in dependency of the rise in the wind velocity.

US 2007/216166A discloses a method for reducing the power output or the rotor speed of a wind turbine. Thereby, the amount of reduction is not based simply on a measured wind speed but on the actual pitch angle of one or more rotor blades. The blade pitch angle is an input value, which on one hand can be easily detected physically and by appropriate control technology and on the other hand is a good indicator of mechanical stresses on the wind turbine.

WO 2001/33075 A1 discloses a method of controlling the operation of a wind turbine, wherein mechanical loads acting on the blades of the rotor of the wind turbine are measured. By controlling the pitch angle of the blades the measured mechanical loads can be maintained below certain limits during the wind turbine operation.

EP 2 096 301 A2 discloses method for operating a wind turbine plant comprising a plurality of wind turbines each having a turbine rotor including at least one blade mounted to a rotatable turbine shaft and an induction generator having a stator and a rotor coupled to the turbine shaft for rotation therewith. A wind speed is measured and a power derating factor is determined in response to the measured wind speed. The determined derating factor is communicated to the plurality of wind turbines. The amount of power generated by each of the plurality of wind turbines is then adjusted in response to the power derating factor.

There may be a need for providing an efficient and flexible control procedure for the operation of a wind turbine, which, at least in some strong wind conditions, allows for keeping the wind turbine in operation.

SUMMARY OF THE INVENTION

This need may be met by the subject matter according to the independent claims. Advantageous embodiments of the present invention are described by the dependent claims.

According to a first aspect of the invention there is provided a method for controlling the rotational speed of a rotor of a wind turbine in particular at high wind speeds. The provided method comprises (a) determining a rotor acceleration value, wherein the rotor acceleration value is caused by a temporal change of the rotational speed of the rotor, and (b) controlling the rotational speed of the rotor as a function of the rotor acceleration value.

The described wind turbine operation control method is based on the idea that the actual rotor acceleration can be taken into account for controlling the rotational speed of the wind turbine rotor. Thereby, the acceleration of the rotor may be used as an indication for the mechanical load, which is currently acting on a structural component (e.g. a rotor blade) of the wind turbine.

For optimally controlling the rotational speed of course also values of other operational parameters of the wind turbine such as for instance the current wind speed and/or other weather conditions may be taken into account. Preferably, if a comparatively strong wind drives the wind turbine lower rotor acceleration values may be accepted. Accordingly, if there is only a comparatively weak wind, which is driving the wind turbine, larger rotor acceleration values may be accepted.

Preferably, rotor accelerations can be decreased by reducing the rotational speed of the wind turbine. A reduced rotor acceleration may in particular result in a less aggressive aerodynamic behavior on the rotor blades.

According to an embodiment of the invention controlling the rotational speed of the rotor comprises (a) determining an internal speed limit, which is based on the rotor acceleration value, and (b) controlling the rotational speed of the rotor (110) as a function of the determined internal speed limit.

The internal speed limit may be used as a speed reference value for a known rotational speed controller. This may provide the advantage that for realizing the described wind turbine operation control method it is not necessary to perform significant modifications of wind turbine hardware equipment. It is rather sufficient to use an appropriately programmed wind turbine control system. Therefore, the described method can be realized in already existing and even in already installed wind turbines without requiring a large effort for modifying the respective wind turbine.

According to a further embodiment of the invention the rotational speed of the rotor is controlled by a speed reference value. Thereby, the speed reference value is the minimum value taken (a) from the internal speed limit and (b) from an external speed limit and/or a nominal speed reference value. This may provide the advantage that the rotor acceleration dependent internal speed limit will only become effective, if compared to the other speed value(s) the internal speed value is the smallest.

The external speed limit may be for instance a parameter, which is provided by a superordinate controller, which not only controls the operation of an individual wind turbine but of a plurality of wind turbines forming a wind farm. The external speed limit may take into account the actual electrical load of an electricity grid, which is connected to the wind turbine. Further, the actual power production of other wind turbines and/or other types of power generating machines may have an impact on the external speed limit.

The nominal speed reference value may be a value, which, when being effective, causes the wind turbine to be operated in the most effective way with respect to a maximum power generation. The nominal speed reference value may depend in particular from the current wind speed.

Generally speaking, the described speed reference value may be specified in different ways:
(A) If the wind turbine should produce a maximum amount of electrical power and there is no risk that structural components of the wind turbine become damaged or consume an inadmissible large fatigue lifetime, the speed reference value will be the nominal speed reference value.
(B) If there are external limitations for the rotational speed of the wind turbine the speed reference value will be the external speed limit.
(C) If the rotor acceleration becomes too large, which is an indication that a structural component (in particular a rotor blade) is exposed to an inadmissible large mechanical load, the speed reference value will be the described rotor acceleration dependent internal speed limit.

According to a further embodiment of the invention controlling the rotational speed of the rotor comprises (a) determining a power generation reference value and/or a blade pitch angle reference value based on the speed reference value and (b) using the power generation reference value for operating the wind turbine and/or adapting the blade pitch angle of at least one blade of the rotor to the blade pitch angle reference value.

The described control method may provide the advantage that it can react on the behavior of the whole wind turbine operation control system including the wind turbine speed control and the blade pitch servo control system. For instance if the pitch system is slow e.g. because of a cold hydraulic oil, the acceleration(s) of the rotor may be higher. However, according to the described method the rotor speed may just be further reduced in order to get the acceleration below an acceptable limit.

According to a further embodiment of the invention determining the internal speed limit comprises (a) measuring the rotational speed of the rotor and (b) calculating the rotor acceleration value by taking the derivative with respect to time of the measured rotational speed.

The rotational speed of the rotor can be measured simply by measuring the rotational speed of the generator or of any element, which is rotationally coupled to the generator and/or to the rotor for instance by means of a gear mechanism.

According to a further embodiment of the invention determining the internal speed limit further comprises taking the absolute value of the calculated rotor acceleration value. This may provide the advantage that the acceleration of the rotor may be used as an indication for the mechanical load also in an operational condition in which the rotational speed of the rotor increases. In this respect it is pointed out that also a negative acceleration, which is caused by a reduction of the rotational speed, may be indicative for comparatively large mechanical loads, which are acting on a structural component (in particular a rotor blade) of the wind turbine.

According to a further embodiment of the invention determining the internal speed limit further comprises filtering the calculated rotor acceleration value. Hence, a smooth signal can be used for further processing the calculated rotor acceleration value. This may provide the advantage that the reliability of the described wind turbine control method can be significantly increased.

According to a further embodiment of the invention determining the internal speed limit further comprises (a) determining an acceleration limit, which represents a maximal allow-able rotor acceleration, and (b) comparing the rotor acceleration value with the determined acceleration limit.

The described comparison may be in particular a subtraction of the acceleration limit from the calculated rotor acceleration value. Thereby, an error signal can be generated which can be used for further processing the rotor acceleration value in such a manner that a reliable and effective wind turbine control can be realized.

The comparison can be performed with the raw rotor acceleration value. However, preferably the comparison is performed with the above mentioned filtered and/or with the absolute value of the calculated rotor acceleration value.

According to a further embodiment of the invention the acceleration limit is determined based on at least one of the following parameters characterizing the actual operational state of the wind turbine: (a) the rotational speed of the rotor, (b) the amount generated power and (c) the pitch angle of at least one blade of the rotor. This may provide the advantage that the operational state of the wind turbine can be detected with measurement devices, which are comprised in usual known wind turbines. There is no need for structurally modifying a known wind turbine in order to be able to carry out the described control method.

According to a further embodiment of the invention the acceleration limit is determined based on (a) an estimated wind speed, (b) the actual wind speed and/or (c) a change of an estimated and/or the actual wind speed. Thereby, the wind speed may be measured by means of any appropriate wind speed measurement device. Further, in addition or alternatively, the wind speed and/or wind speed changes may be estimated by an appropriate wind speed estimation method. Such an estimation method may rely not on the output of a wind meter but on different operational parameters of the wind turbine, which is exposed to the wind.

According to a further embodiment of the invention determining the internal speed limit further comprises integrating over time a result of comparing the rotor acceleration value with the determined acceleration limit. This may provide the advantage that an acceleration value will be transferred into a velocity or speed value. The resulting speed value, which may represent the above mentioned speed limit, can be easily compared with the above mentioned external speed limit and/or with the above mentioned nominal speed reference value.

It is mentioned that the transfer of an acceleration value into a speed value is reflected by the change of the physical unit, which results from the integration over time. Specifically, when a progress of acceleration values (unit m/s$^2$) is integrated over time a velocity (unit m/s) is yielded.

It is further mentioned that the described integration may also comprise an appropriate multiplication with an integrator gain. Further, the described integration may also comprise an appropriate rate limiting, which ensures, that errors of the preceding processing chain, which errors yield an off-limit result, can be finally rejected.

According to a further aspect of the invention there is provided a control system for controlling the rotational speed of a rotor of a wind turbine in particular at high wind speeds. The provided control system comprises (a) a determining arrangement for determining a rotor acceleration value, wherein the rotor acceleration value is caused by a temporal change of the rotational speed of the rotor, and (b) a control unit for controlling the rotational speed of the rotor as a function of the determined rotor acceleration value.

Also the described control system is based on the idea that acceleration of the rotor may be used as an indication for the mechanical load, which is currently acting on a structural component (e.g. a rotor blade) of the wind turbine. As a consequence, in accordance with the present invention the actual rotor acceleration can be taken into account for controlling the rotational speed of the wind turbine rotor.

According to a further aspect of the invention there is provided a wind turbine for generating electrical power. The provided wind turbine comprises (a) a rotor having at least one blade, wherein the rotor is rotatable around a rotational axis and the at least one blade extends radial with respect to the rotational axis, (b) a generator being mechanically coupled with the rotor, and (c) a control system as described above.

According to a further aspect of the invention there is provided a computer program for controlling the operation of a wind turbine in particular at high wind speeds. The computer program, when being executed by a data processor, is adapted for controlling and/or for carrying out the above described rotational speed control method.

As used herein, reference to a computer program is intended to be equivalent to a reference to a program element and/or to a computer readable medium containing instructions for controlling a computer system to coordinate the performance of the above described method.

The computer program may be implemented as computer readable instruction code in any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The invention may be realized by means of a computer program respectively software. However, the invention may also be realized by means of one or more specific electronic circuits respectively hardware. Furthermore, the invention may also be realized in a hybrid form, i.e. in a combination of software modules and hardware modules.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
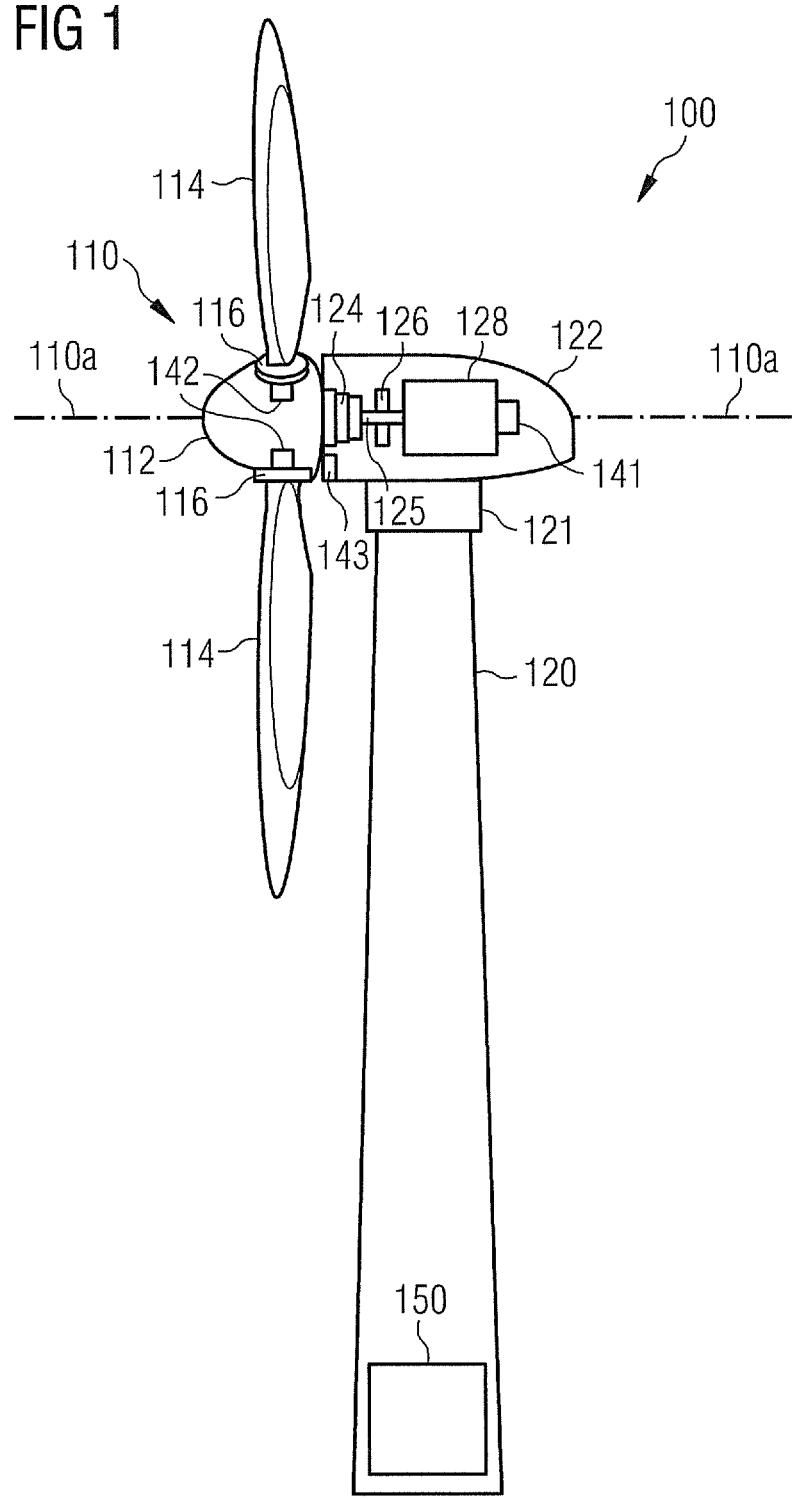
FIG. 1 shows a wind turbine according to an embodiment of the present invention.

The illustration in the drawing is schematically. It is noted that in different figures, similar or identical elements are provided with reference signs, which are different from the corresponding reference signs only within the first digit.

FIG. 1 shows a wind turbine 100 according to an embodiment of the invention. The wind turbine 100 comprises a tower 120, which is mounted on a non-depicted fundament. On top of the tower 120 there is arranged a nacelle 122. In between the tower 120 and the nacelle 122 there is provided a yaw angle adjustment device 121, which is capable of rotating the nacelle 122 around a non depicted vertical axis, which is aligned with the longitudinal extension of the tower 120. By controlling the yaw angle adjustment device 121 in an appropriate manner it can be made sure, that during a normal operation of the wind turbine 100 the nacelle 122 is always properly aligned with the current wind direction. However, in order to reduce the mechanical load acting on structural components of the wind turbine the yaw angle adjustment device 121 can also be used to adjust the yaw angle to a position, wherein the nacelle 122 is intentionally not perfectly aligned with the current wind direction.

The wind turbine 100 further comprises a rotor 110 having three blades 114. In the perspective of FIG. 1 only two blades 114 are visible. The rotor 110 is rotatable around a rotational axis 110a. The blades 114, which are mounted at a driving 112, which is also called a hub, extend radial with respect to the rotational axis 110a.

In between the driving collar 112 and a blade 114 there is respectively provided a blade adjustment device 116 in order to adjust the blade pitch angle of each blade 114 by rotating the respective blade 114 around a non depicted axis being aligned substantially parallel with the longitudinal extension of the respective blade 114. By controlling the blade adjustment device 116 the blade pitch angle of the respective blade 114 can be adjusted in such a manner that at least when the wind is not so strong a maximum wind power can be retrieved from the available wind power. However, in order to reduce a mechanical load acting on the respective blade 114, the blade pitch angle can also be intentionally adjusted to a position, in which only a reduced wind power can be captured.

As can be seen from FIG. 1, within the nacelle 122 there is provided a gear box 124. The gear box 124 is used to convert the number of revolutions of the rotor 110 into a higher number of revolutions of a shaft 125, which is coupled in a known manner to a generator 128. Further, a brake 126 is provided in order to stop the operation of the wind turbine 100 or to reduce the rotational speed of the rotor 110 for instance (a) in case of an emergency, (b) in case of too strong wind conditions, which might harm the wind turbine 100, and/or (c) in case of an intentional saving of the consumed fatigue life time and/or the fatigue life time consumption rate of at least one structural component of the wind turbine 100.

The wind turbine 100 further comprises a control system 150 for operating the wind turbine 100 in a highly efficient manner. Apart from controlling for instance the yaw angle adjustment device 121 the depicted control system 150 is also used for controlling the rotational speed of the rotor 110 by adjusting the blade pitch angle of the rotor blades 114 and by determining an appropriate power generation reference value for the wind turbine 100 in an optimized manner. Further, as will be described below in more detail, the control system 150 is used for adjusting the yaw angle of the nacelle 122 respectively of the rotor 110.

For controlling the operation of the wind turbine 100 the control system 150 is connected to a rotational speed sensor 143, which according to the embodiment described here is connected to the gear box 124. The rotational speed sensor 143 feeds a signal to the control system 150, which is indicative for the current rotational speed of the rotor 110.

Although being not essential for the carrying out the described method and for realizing the described control system for controlling the rotational speed of the rotor 110, the wind turbine 100 comprises (a) a power sensor 141 being connected to the generator 128 and (b) angle sensors 142, which, according to the embodiment described here, are connected to the respective blade adjustment device 116. The power sensor 141 provides information about the current power production of the wind turbine 100. The angle sensors 142 provide information about the current blade pitch angle settings of all rotor blades 114.

Figure 2:
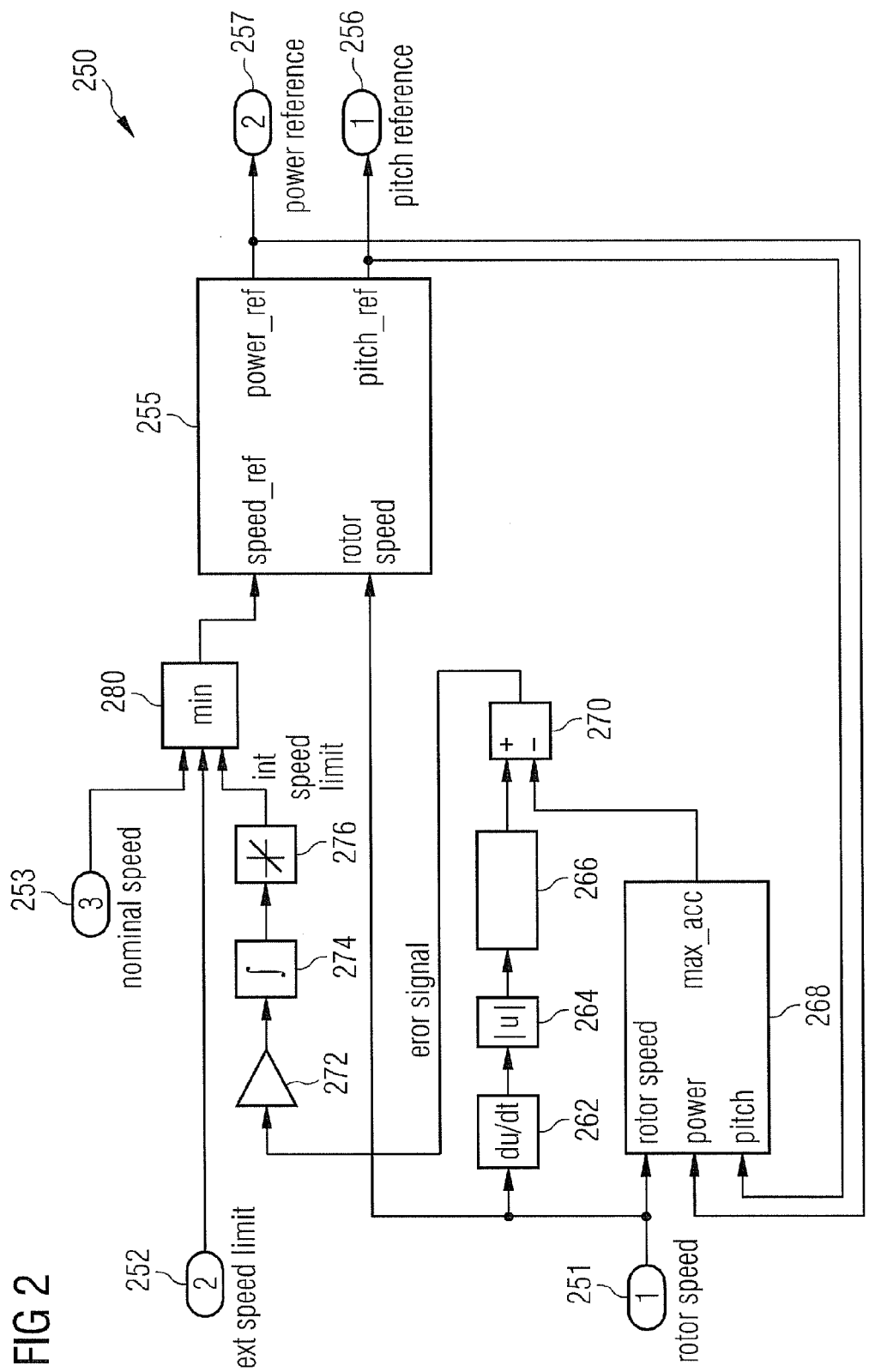
FIG. 2 shows in accordance with an embodiment of the invention a control system for controlling the rotational speed of a rotor of a wind turbine.

FIG. 2 shows in accordance with an embodiment of the invention a control system 250 for controlling the rotational speed of the rotor 110 of the wind turbine 100. The control system 250 comprises three input terminals, a first input terminal 251 for receiving a value representing the actual rotor speed, a second input terminal 252 for receiving a value representing an external speed limit and a third input terminal 253 for receiving a value representing the nominal speed of the wind turbine. As will be described below in more detail the three input terminals 251, 252 and 253 are connected to a rotor speed control unit 255. The rotor speed control unit 255 comprises two output terminals, a first output terminal 256 for providing a reference value for the blade pitch angle and a second output terminal 257 for providing a reference value for the amount of power generation.

As can be seen from FIG. 2, the rotor speed, which could be taken from the rotational speed of the generator 128 and which is provided via the first input terminal 251, is differentiated by a differentiating unit 262. From the resulting differentiated signal the absolute value is taken by an absolute value determination unit 264. Further, the resulting absolute value is filtered by a filter 266 in order to further process a smooth signal. The filtered/smoothed signal is fed to the positive input of an adding unit 270.

Further, a maximum rotor speed acceleration value (max-acc) is calculated by a calculation unit 268. Thereby, the maximum rotor speed acceleration value is calculated as a function of (a) the actual rotational speed of the rotor, (b) the actual amount of generated power and (c) the actual blade pitch angle of the rotor blades. With the adding unit 270 the calculated maximum rotor speed acceleration value is subtracted from the measured absolute acceleration. This subtraction leads to an error signal.

As can be further seen from FIG. 2, the error signal is fed to an integration arrangement, which comprises a multiplication unit 272 for introducing an integrator gain, an integrator 274 for integrating the error signal over time and a rate limiting unit 276. The integration arrangement 272, 274, 276 yields an internal (rotational) speed limit. The rate of change of this internal (rotational) speed limit is limited by the unit 276 in order to get a smooth signal before it is compared with the nominal speed reference and externals speed limits.

A selection unit 280, which receives (a) the internal (rotational) speed limit, (b) the external speed limit and (c) the nominal speed of the wind turbine, selects the lowest value of these three signals and feeds this lowest signal into the rotor speed control unit 255 as a reference (rotational) speed signal (speed_ref). Based on this reference (rotational) speed signal and based on the rotor speed value, which is received by the first input terminal 251, the rotor speed control unit 255 calculates a value "power_ref", which represents the reference value for the amount of power generation (see terminal 257), and a value "pitch_ref", which represents the reference value for the blade pitch angle (see terminal 256).

It is mentioned that instead of and/or in addition to decreasing the reference (rotational) speed signal (speed_ref), if the wind speed becomes too high, the minimum pitch angle could be increased based on a rotor acceleration value. This will also lead to reduced mechanical loads in a high wind speed situation.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A method for controlling the rotational speed of a rotor of a wind turbine during high wind speeds, the method comprising determining a rotor acceleration value, wherein the rotor acceleration value is caused by a temporal change of the rotational speed of the rotor;

controlling the rotational speed of the rotor as a function of the determined internal speed limit;

measuring the rotational speed of the rotor, calculating the rotor acceleration value by taking the derivative with respect to time of the measured rotational speed;

taking the absolute value of the calculated rotor acceleration value; and determining an internal speed limit based on absolute value of the calculated rotor acceleration value.

2. The method as set forth in claim 1, comrpsing providing an external speed limit and/or a nominal speed reference value, wherein the rotational speed of the rotor is controlled by a speed reference value, and the speed reference value is the minimum value taken (a) from the internal speed limit, and (b) from the external speed limit and/or the nominal speed reference value.

3. The method as set forth in claim 2, wherein the controlling the rotational speed of the rotor comprises:

determining a power generation reference value and/or a blade pitch angle reference value based on the speed reference value, and using the power generation reference value for operating the wind turbine and adapting the blade pitch angle of at least one blade of the rotor to the blade pitch angle reference value.

4. The method as set forth in claim 2, wherein the controlling the rotational speed of the rotor comprises:

determining a power generation reference value and/or a blade pitch angle reference value based on the speed reference value, and using the power generation reference value for operating the wind turbine.

5. The method as set forth in claim 2, wherein the controlling the rotational speed of the rotor comprises:

determining a power generation reference value and/or a blade pitch angle reference value based on the speed reference value, and using the power generation reference value for adapting the blade pitch angle of at least one blade of the rotor to the blade pitch angle reference value.

6. The method as set forth in claim 4, wherein the determining the internal speed limit further comprises:

filtering the calculated rotor acceleration value.

7. The method as set forth in claim 4, wherein the determining the internal speed limit further comprises determining an acceleration limit, which represents a maximal allowable rotor acceleration, and comparing the rotor acceleration value with the determined acceleration limit.

8. The method as set forth in claim 2, wherein the acceleration limit is determined based on at least one of the following parameters characterizing the actual operational state of the wind turbine;

(a) the rotational speed of the rotor, (b) the amount generated power, and (c) the pitch angle of at least one blade of the rotor.

9. The method as set forth in claim 2, wherein the acceleration limit is determined based on an estimated wind speed, the actual wind speed and/or a change of an estimated and/or actual wind speed.

10. The method as set forth in claim 2, wherein the determining the internal speed limit further comprises:

integrating over time a result of comparing the rotor acceleration value with the determined acceleration limit.

11. A computer program for controlling the operation of a wind turbine at high wind speeds, the computer program, when being executed by a data processor, is adapted for controlling and carrying out the method as set forth in claim 1.

* * * * *